United States Patent [19]

Carbolante

[11] Patent Number: 5,191,269
[45] Date of Patent: Mar. 2, 1993

[54] BRUSHLESS DIRECT CURRENT MOTOR WITH MINIMIZED CURRENT RIPPLE AND METHOD

[75] Inventor: Francesco Carbolante, Phoenix, Ariz.

[73] Assignee: SGS-Thomson Microelectronics, Inc., Carrollton, Tex.

[21] Appl. No.: 774,793

[22] Filed: Oct. 10, 1991

[51] Int. Cl.$^5$ .............................................. H02P 6/02
[52] U.S. Cl. .................................... 318/254; 318/138
[58] Field of Search ............... 318/138, 254, 432, 433, 318/439

[56] References Cited

U.S. PATENT DOCUMENTS

| | | | |
|---|---|---|---|
| 4,511,827 | 4/1985 | Morinaga et al. | 318/254 |
| 4,633,150 | 12/1986 | Inaji et al. | 318/254 |
| 4,651,067 | 3/1987 | Ito et al. | 318/254 |
| 4,658,190 | 4/1987 | Miyazaki et al. | 318/254 |
| 4,777,414 | 10/1988 | Storath et al. | 318/138 |

Primary Examiner—Bentsu Ro
Attorney, Agent, or Firm—Ronald S. Lombard; Richard A. Bachand; Lisa K. Jorgenson

[57] ABSTRACT

A brushless direct current motor with minimized current ripple and a method is disclosed. The motor system includes commutation current control for controlling the rate of turn-off of the current flowing in the phase being turned-off while simultaneously controlling the rate of turn-on of the current flowing in the phases being excited. This minimizes torque ripple in the motor.

22 Claims, 3 Drawing Sheets

BRUSHLESS DIRECT CURRENT MOTOR WITH MINIMIZED CURRENT RIPPLE AND METHOD

The present invention relates to a brushless direct current motor, and, in particular, to a brushless direct current motor system with minimized total current ripple. Brushless direct current motors are used in applications such as disk drives and video cassette recorders and are typically under stringent requirements regarding their performance in these applications. During phase commutation of such a motor, which is achieved by switching off the current on one phase while at the same time switching on the current on another phase, current ripple has been a problem. It is known in the art that the commutation should be performed to achieve maximum efficiency when the back electromotive force on the two phases is equal and the torque provided for the same current is also equal. The total effective torque is given by the sum of the individual torques generated by each phase and can be expressed as:

$$T = K_{T1}I_1 + K_{T2}I_2 + \ldots + K_{TN}I_N$$

Where T is the torque, $K_{Ti}$ is the torque constant for each phase in a given position of the rotor with respect to the stator. $I_i$ is the current flowing through each phase, and N is the number of the phase. It has been a problem with such motors when commutating between phases that a torque ripple is introduced which results in undesirable acoustical noise produced by the motor and unnecessary wear on the motor.

SUMMARY OF THE INVENTION

The present invention overcomes these difficulties by providing the hereinafter described improvement in combination with a brushless direct current motor system. As is well known in the art, such a motor system typically includes a brushless direct current motor including a permanent magnet rotor and a stator having multiple phases. A commutator means is included for controlling the timing and sequencing of excitation between the multiple phases in a predetermined commutation sequence A driver is included for providing current flow to the multiple phases as controlled by the commutator. A voltage supply provides a voltage source to the driver. The brushless direct current motor described thus far is well known in the art. Typically, the stator of such a motor consists of three phases and is usually connected in a wye or delta configuration. The driver together with the commutator usually provides either unipolar excitation where only one of the three phases are excited at any particular time, or bipolar excitation where two of three phases are excited at any particular time.

The improvement of the present invention provides that the driver further includes commutation current control for controlling, during commutation between the phases, the rate of turn-off of the current flowing in one of the phases while simultaneously controlling the rate of turn-on of the current flowing in another of the multiple phases to maintain a constant total current flowing in the multiple phases when commutating between one phase and another phase. The present invention minimizes the current ripple in the motor, thereby controlling torque ripple and preventing unnecessary deterioration of the motor and unwanted acoustical noise. Also electromagnetic interference is minimized by this invention.

In the typical case, where the stator comprises three phases, the commutation current control of the present invention includes a current sensing resistor having one end connected in circuit with one end of the one phase and one end of another of the phases. The current sensing resistor has the other end connected in circuit with ground.

Preferably, the commutation current control further comprises a first transistor means, preferably but not necessarily a first insulated gate enhancement mode field effect transistor having the drain connected in circuit with the one end of one phase and the source connected in circuit with the one end of the current sensing resistor. A second transistor means, preferably, but not necessarily a second insulated gate enhancement mode field effect transistor is provided having the drain connected in circuit with one end of the other phase and the source connected in circuit with the one end of the current sensing resistor.

Preferably, the commutation current control further comprises an operational amplifier. Such an operational amplifier typically has an inverting input and a non-inverting input. A voltage source having a predetermined voltage is connected in circuit with the noninverting input of the operational amplifier. The inverting input is connected in circuit with the current sensing resistor. A first switch is provided and connected in circuit between the output of the operational amplifier and the gate of the first transistor. The first switch is in operative relationship with the commutator. A second switch is provided and connected in circuit between the output of the operational amplifier and the gate of the second transistor. The second switch is also in operative relationship with the commutator.

A first slew rate control is provided and is connected in circuit between the first switch and the gate of the first transistor and the drain of the first transistor. Upon the commutator causing the first switch to open while causing the second switch to close, the slew-rate control controls the rate of turn-off of the current flowing in the one phase while the current sensing resistor senses the sum of the current flowing in the first transistor and the second transistor. The current sensing resistor imposes a feedback voltage indicative of the summed current of the first and second transistors at the inverting input of the operational amplifier. The operational amplifier produces a voltage at the output of the operational amplifier representative of the voltage difference between the predetermined voltage of the voltage source and the feedback voltage, whereby the voltage difference at the gate of the second transistor controls the rate of turn on of the other phase so that the total current in the phases is maintained constant through the commutation and is equal to $V_{IN}$ divided by the resistance of the sensing resistor.

Preferably, the first slew-rate control comprises a first current integrator. The first current integrator includes a first buffer amplifier having a predetermined operating frequency range and is connected in circuit between the first switch and the gate of the first transistor. A first current source is provided and connected in circuit with the input of the first buffer amplifier. The first current source may be a constant current source. A first capacitor is connected in circuit between the input of the first buffer amplifier and the drain of the first transistor.

Preferably, the first buffer amplifier has a predetermined output impedance preferably less than 500 ohms over its operating frequency range. It has been found that the first buffer amplifier preferably has an operating frequency range such that the bandwidth of said first buffer amplifier is at least ten times the resonant frequency of said one phase including parasitics together with said first transistor.

The combination of the present invention desirably further comprises a second slew-rate control for providing slew-rate control of the other phase when the other phase is turned-off by the commutator. The second slew-rate control preferably includes a second current integrator. The second slew-rate control is connected in circuit between the second switch and the gate of the second transistor and the drain of the second transistor.

The second slew-rate control preferably also comprises a second buffer amplifier having a predetermined operating frequency range and is connected in circuit between the second switch and the gate of the second transistor. A second current source is connected in the circuit with the input of the second buffer amplifier. A second capacitor is connected in circuit between the input of the second buffer amplifier and the drain of the second field effect transistor.

The second buffer amplifier desirably has the same characteristics as described for the first buffer amplifier.

The foregoing would also apply to third, fourth and successive phases, where each successive phase would be connected in circuit with its own respective slew rate control. The slew rate control functions when that phase is being turned off.

A method of practicing the present invention is also disclosed.

BRIEF DESCRIPTION OF THE DRAWINGS

For a better understanding of the present invention, reference may be had to the accompanying drawings exemplary of the invention, in which.

DESCRIPTION OF THE PREFERRED EMBODIMENTS

Figure 1:
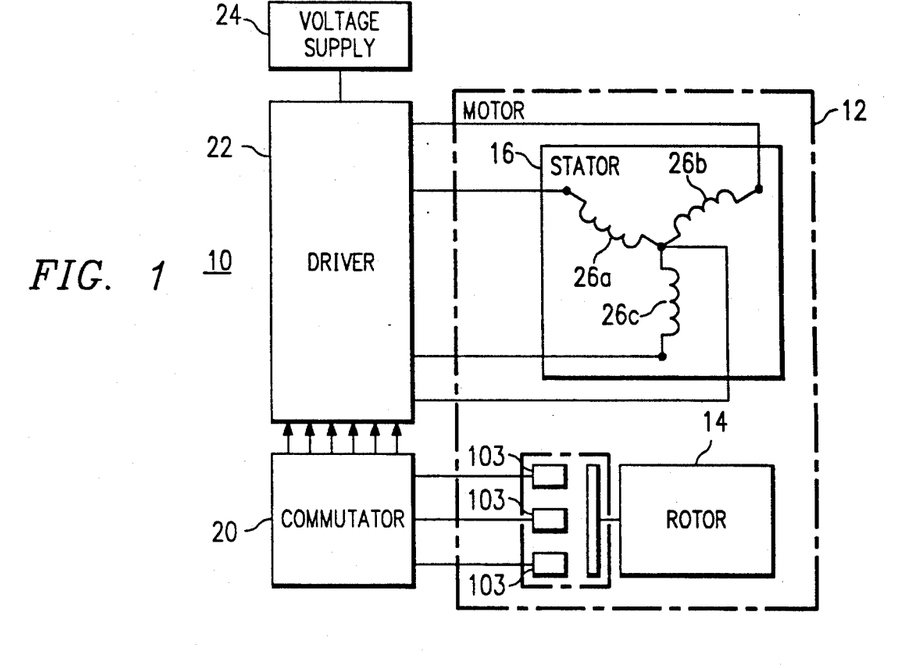
FIG. 1 is a schematic diagram of a typical motor system in which a preferred embodiment of the invention may be employed.

In FIG. 1 is shown a schematic diagram of a typical brushless direct current motor system 10. System 10 includes a brushless direct current motor 12 including a permanent magnet rotor 14 and a stator 16 having multiple phases 26a, 26b, and 26c, for example. Commutator 20 is provided for controlling the timing and sequencing of excitation between the multiple phases 26a, 26b and 26c in a predetermined commutation sequence, as is known in the art. Hall sensors 103 are typically used to detect the position of the rotor. Optical encoders or back electromotive force detection may also be used for determining commutation instances. A driver 22 is provided for providing current flow to the multiple phases 16 as controlled by the commutator 20. A voltage supply 24 provides a voltage source for the driver 22. As stated previously, such a motor may be used for disk drive and video cassette applications, for example. An example of such a motor is one manufactured by NIDEC, Model No. 2527-42FX-01. The stator 16 of such a motor typically has three phases 26a, 26b, and 26c, as shown in FIGS. 1 and 2.

Figure 2:
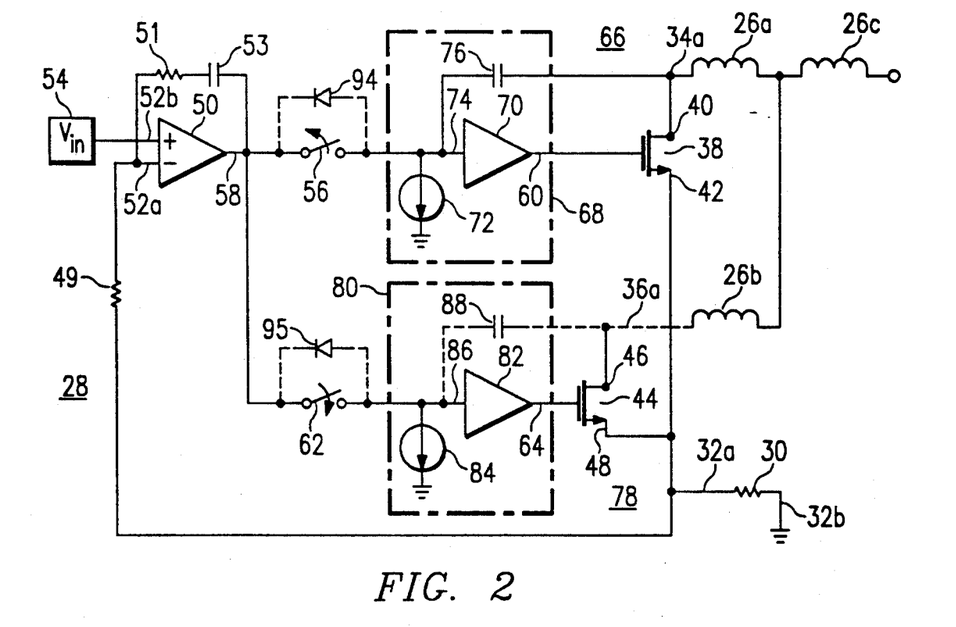
FIG. 2 is a schematic diagram of the preferred embodiment of the present invention.

In FIG. 2 is shown the improvement of the present invention in which the driver 22 further comprises commutation current control 28 for controlling the rate of turn-off of the current flowing in one of the phases 26a, for example, while simultaneously controlling the rate of turn-on of the current flowing in another phase 26b of the multiple phases 16 to maintain a constant total current flowing in the multiple phases when commutating between one phase 26a and another phase 26b, for example, and so on. FIG. 2 is a simplified schematic and the same configuration would also apply when commutating between phases 26b to 26c and also 26c to 26a. The present invention minimizes the current ripple in the motor 12, thereby controlling torque ripple and preventing unnecessary stress to the motor and unwanted acoustical noise. As discussed before, commutation between phases is usually performed at an angular region in which the two torque constants are approximately equal, assuming that the current is commutated between only 2 phases. Thus,

KT1=KT2=KT

T=KT (I1+I2)

From this, it can be seen that the torque ripple can be minimized by maintaining constant the total current I1+I2. By reducing the torque ripple of the motor, the noise performance of the motor is improved by decreasing the acoustical noise.

The commutation current control 28 preferably includes a current sensing resistor 30, having one end 32a connected in circuit with one end 34a of the one phase 26a and one end 36a of another phase 26b. The other end 32b of the current sensing resistor 30 is connected to ground.

The commutation current control 28 as shown in FIG. 2 further includes a first transistor 38, preferably but not necessarily a first IGFET (insulated gate enhancement mode field effect transistor,. Transistor 38 may also be a bipolar NPN transistor, for example. Transistor 38 has its drain 40 connected in circuit with the one end 34a of the one phase 26a. The source 42 of the first transistor 38 is connected in circuit with the one end 32a of the current sensing resistor A second .transistor 44, preferably, but not necessarily a second insulated gate enhancement mode field effect transistor is provided. Transistor 44 may also be a bipolar NPN transistor. Transistor 44 has its drain 46 connected in circuit with the one end 36a of the other phase 26b. The source 48 of the second transistor 44 is connected in circuit with the one end 32a of the current sensing resistor 30.

The commutation current control 2B desirably further includes an operational amplifier 50 having an inverting input 52a and a non-inverting input 52b. A voltage source 54, $V_{IN}$, is provided whereby current flowing in the motor is $V_{IN}R_{SENSE}$, where $R_{SENSE}$ is the resistance of current sensing resistor 30. The voltage source 54 is connected in circuit with the non-inverting input 52b of the operational amplifier 50. The inverting input 52a of the operational amplifier 50 is connected in circuit with the current sensing resistor 30. A first switch 56 is connected in circuit between the output 58 of the operational amplifier 50 and the gate 60 of the first transistor 38. The first switch 56 is in operative relationship with the commutation means 20 (connection not shown). A second switch 62 is connected in circuit between the output 58 of the operational amplifier 50 and the gate 64 of the second transistor 44. A first slew-rate control 66 is connected in circuit between the first switch 56 and the gate 60 of the first transistor 38 and the drain 40 of the first transistor 38.

Preferably, the first slew-rate control 66 includes a first current integrator 68 connected in circuit between the first switch 56 and the gate 60 of the first transistor 38 and the drain 40 of the first transistor 38. Preferably, the first current integrator 68 includes a first buffer amplifier 70 having a predetermined operating frequency range connected in circuit between the first switch 56 and the gate 60 of the first field effect transistor 38. A first current source 72 is connected in circuit with the input 74 of the first buffer amplifier 70. The first current source 72 may be a constant current source if linear output voltage slewing is desired. A first capacitor 76 is connected in circuit between the input 74 of the first buffer amplifier 70 and the drain 40 of the first field effect transistor 38.

Preferably, the first buffer amplifier 70 has a predetermined impedance less than 500 ohms over its predetermined operating frequency range. Preferably the first buffer amplifier 70 has an operating frequency range such that its bandwidth is at least ten times the resonant frequency of the one phase 26a including parasitics together with the first transistor 38. This constraint makes amplifier 70 a "high speed" buffer amplifier.

Preferably, the present invention includes a second slew-rate control 78 for providing slew-rate control of the other phase 26b when the other phase 26b is turned off by the commutator 20, for example. With a three phase motor each phase would be provided with slew-rate control of the present invention which functions when that phase is being turned off. The second slew-rate control 78 is connected in circuit between the second switch 62 and the gate 64 of the second transistor 44 and the drain 46 of the second transistor 44.

As for the first slew-rate control 66, it is desirable that the second slew-rate control 78 includes a second current integrator 80. The second current integrator 80 preferably includes a second buffer amplifier 82 having a predetermined operating frequency range. The buffer amplifier 82 is connected in circuit between the second switch 62 and the gate 64 of the second transistor 44. A second current source 84 is connected in circuit with the input 86 of the second buffer amplifier. The second current source 84 may be a constant current source if linear output voltage slewing is desired. A second capacitor 88 is connected in circuit between the input 86 of the second buffer amplifier and the drain 46 of the second transistor 44. Preferably, the second buffer amplifier 82 has the same characteristics described previously for the first buffer amplifier 70.

The object of the present invention is to maintain a constant total current during commutation. When the first transistor 38 is turned off upon the first switch 56 opening as a result of a signal from commutator 20, it is controlled so as to limit the output voltage slew-rate of phase 26a. The voltage of the phase being turned off is shown as voltage, V1, in FIGS. 3 and 4.

Figure 4:
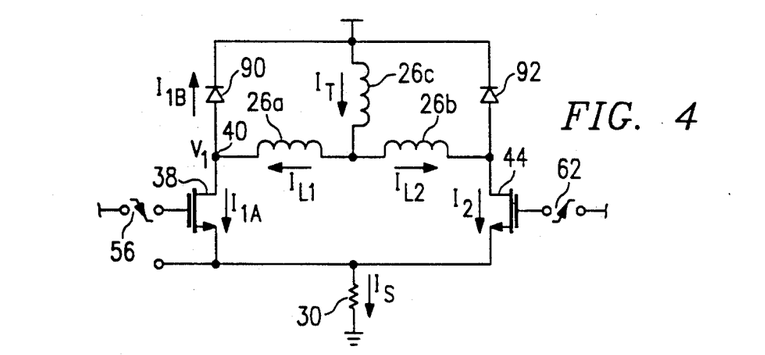
FIG. 4 is a schematic diagram of the drivers of an ideal control loop representative of the present invention.
Figure 5:
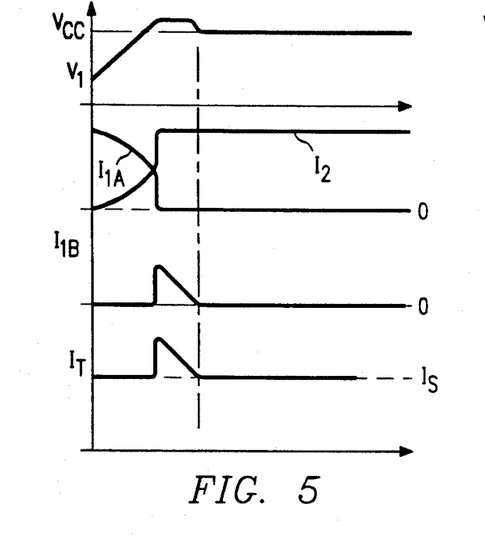
FIG. 5 are plots of the parameters shown in FIG. 4 in the case where the voltage slew-rate is too fast.
Figure 6:
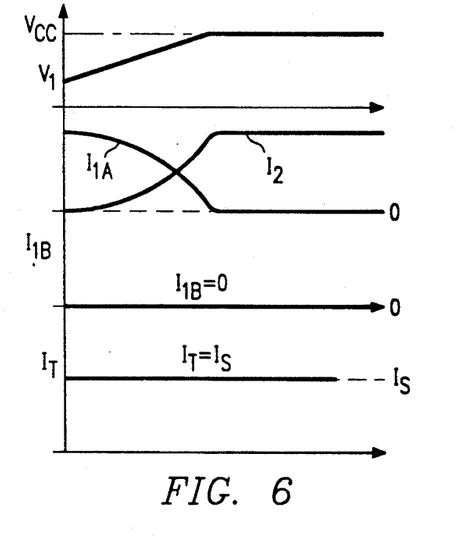
FIG. 6 are plots of the parameters shown in FIG. 4 when the voltage slew-rate is proper according to the present invention.

Since the current on phase 26a is proportional to the integral of the voltage applied to its inductive component, the limitation on the voltage slew-rate makes it possible to control the rate of turn-on of the second transistor 44 so that a constant total current is achieved throughout the transition. The low impedance of the operational amplifier 50 when connected to one of the buffers 70 or 82 overrides the effect of the slew-rate control circuitry. By appropriately controlling the slew-rate, it is possible to avoid or minimize the current recirculation on the free-wheeling diodes 90, 92, shown in FIG. 4, so that the total current is always flowing through the sensing resistor 30 allowing the correct feedback to always be present. In FIG. 5, the free circulation on the free wheeling diodes is too fast, and current, $I_{1B}$ for one of the diodes represents current recirculation not passing through the sensing resistor 30, whereas, in FIG. 6 is shown the preferred embodiment of slow recirculation, i.e., where the slew-rate is long enough to avoid current recirculation through the free-wheeling diodes.

With reference again to FIG. 2 it is found desirable to include bypass diodes 94 and 95 in parallel with the first switch 56, and second switch 62 respectively. The first switch 56 may be a transfer gate 96 such as shown in FIG. A such as manufactured by SGS-Thomson Model No. HCC4016. The addition of bypass diodes 94 and 95 in parallel with the first and second switches improves the performance of the switching by allowing the slew-rate circuitry to be ineffective for a brief instant, such as 1$\mu$ seconds at turn off, so that any glitch due to the instantaneous turn on of the second field effect transistor 44 is minimized by partial compensation.

Capacitors 53 and resistors 49 and 51 are included for loop stability.

Figure 7:
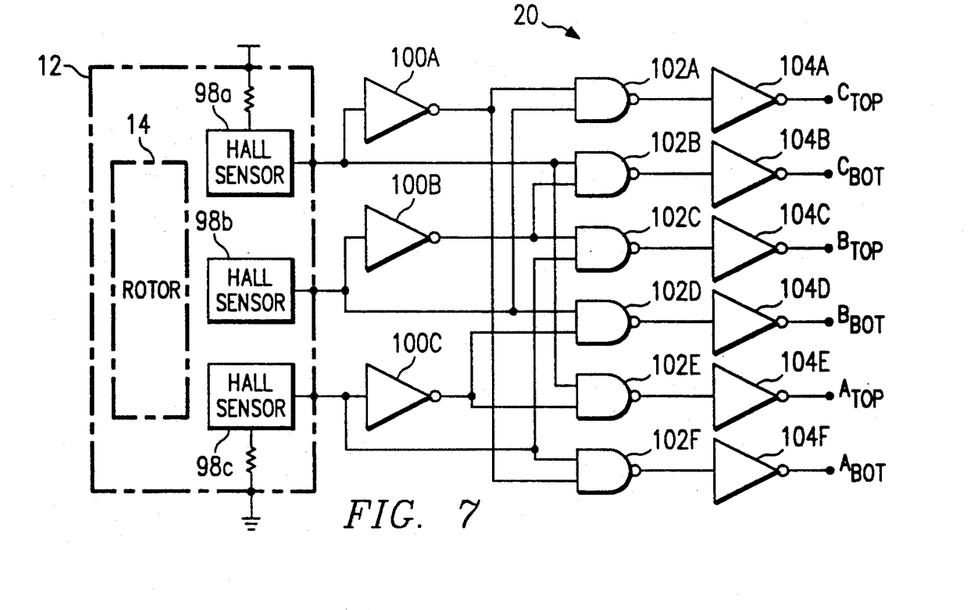
FIG. 7 is a schematic diagram of a typical brushless direct current motor driver commutation scheme.
Figure 8A:
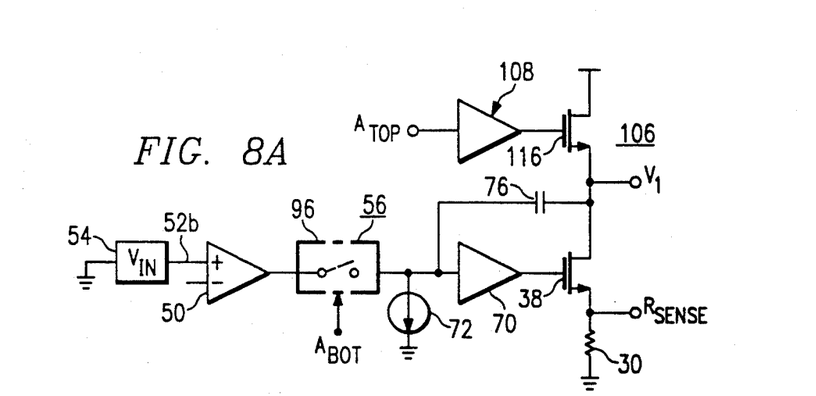
FIG. 8A is a schematic diagram showing a preferred embodiment of one of the drivers of the present invention.
Figure 8B:
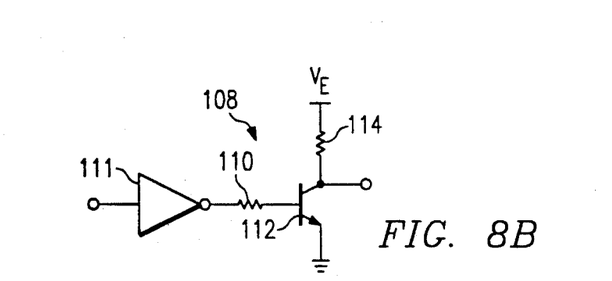
FIG. 8B is a schematic diagram of the buffer amplifier as shown in circuit without $A_{TOP}$ shown in FIG. 8A.

Referring to FIGS. 7, 8A and 8B, there is shown a typical brushless motor commutation scheme applicable to the present invention, where like numerals represent like components as previously discussed. With reference to FIG. 7, a commutator 20 is shown for bipolar excitation of the motor 12. The motor 12 usually includes Hall sensors 98a, 98b, 98c which sense the position of the rotor 14 as well is known in the art. The outputs of the Hall sensors are connected in circuit as shown in FIG. 7 to the input of the commutator 20. The commutator 20 includes first inverters 100A-100C, NAND gates 102A-102F and second inverters 104A-104F. The output of the commutator 20 consists of 6 outputs $C_{TOP}$, $C_{BOT}$, $B_{TOP}$, $B_{BOT}$, $A_{TOP}$ and $A_{BOT}$ as shown in FIG. 7. For example, $A_{TOP}$ and $A_{BOT}$ consist of 1 output stage 106 with the outputs $A_{TOP}$ and $A_{BOT}$ connected as shown in FIG. 8A. The two other output stages are not shown but are the same as output stage 106 for the remaining two phases of the three phase motor. FIG. 8B depicts the detailed structure of the third buffer 108 shown in FIG. 8A. The third buffer 108 includes inverter 111, resistor 110, transistor 112 and resistor 114. The circuit in FIG. 8A also includes third transistor 116, which may be an insulated gate enhancement field effect transistor. The output $V_1$ is the same $V_1$ shown in FIG. 3 for point of reference. The circuits shown in FIGS. 7 and 8A function as follows.

Hall sensors 98a, 98b, and 98c (or other position detectors) provide a digital signal the transitions/levels of which identify the rotor position. Combinational logic 100, ... 102, ... 104 decodes the outputs of Hall sensors 98a, 98b, and 98c to provide signals $A_{TOP}$... $C_{BOT}$ which correctly identify which output drivers have to be turned on, as is well known in the art.

The circuit in FIG. 8B provides a voltage level translation to properly drive transistor 116.

The circuit in FIG. 8A provides the adequate interfacing of control voltage $V_{IN}$ to drive transistor 38 and regulate the motor current.

When switch 56 is closed, the output of operational amplifier 50 is connected to the gate of transistor 38 through buffer amplifier 70. In this condition capacitor 76 and current source 72 are inconsequential, due to the low impedance presented by the output of operational amplifier 50 and switch 56.

When switch 56 is opened, the input of buffer 70 is disconnected from operational amplifier 50. Current source 72 will drive the input of buffer 70 toward ground and also the gate of transistor 38. The rate of turn-off of transistor 38 is determined by the feedback of capacitor 76 which will force a linear voltage ramp at the output V1 by integrating the current of constant current 72, assuming its constant. Unless some other mechanism interrupts this evolution, the linear voltage ramp will continue until the load current which flowed through transistor 38 is fully exhausted, at which point transistor 38 is completely off and remains such.

Figure 3:
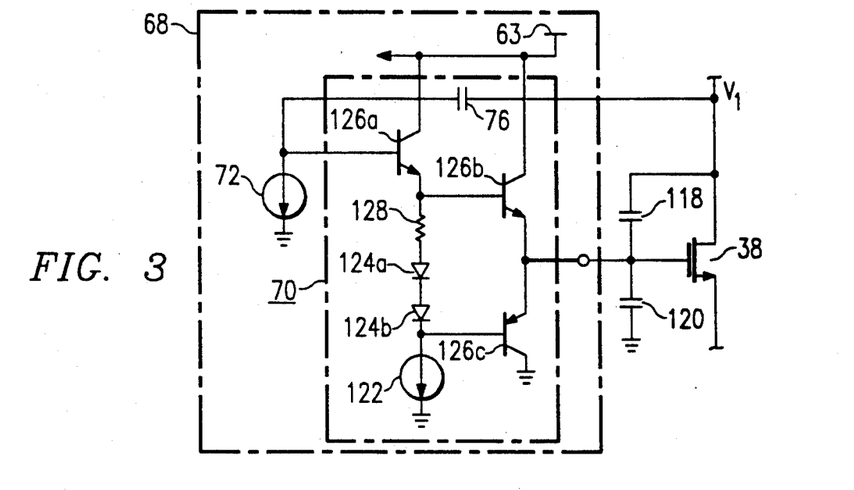
FIG. 3 is a schematic diagram of the slew-rate control showing the detailed preferred embodiment of the first current integrator.

In FIG. 3 is shown a preferred embodiment of the first current integrator 68, where like numerals represent like components. Capacitor 118 represents the gate-drain capacitance of the first field effect transistor 38 and capacitor 120 represents the gate-source capacitance of the first field effect transistor 38. In the past, when operating with such a field effect transistor 38, the gate-drain capacitance 118 has been found to cause unwanted oscillations and made it difficult to control the slew-rate of an inductive load. The circuit shown in FIG. 3 overcomes this problem by using a current integrator 68, and the gate-drain capacitance 118 is eliminated as a factor, and the voltage slew-rate may be effectively controlled. The circuit of FIG. 3 further includes a biasing current source 122, diodes 124a, 124b and transistors 126a, 126b and 126c.

The following is a table of components for the circuits shown in FIGS. 1, 2, 3, 4, 7, 8A and 8B.

TABLE OF COMPONENTS

| Component | Manufacturer | Model | Value |
|---|---|---|---|
| Motor (12) | NIDEC | 2527-42FX-01 | |
| Resistor (30) | | | 1 ohm |
| Field Effect Transistors (38) (44) | SGS Thomson | SGSP358 | |
| OP-AMP (50) | SGS Thomson | LM358/A | |
| Switches (56) (62) | SGS Thomson | HCC4016 | |
| Transistors (126a) (126b) | | 2N2222 | |
| Resistor (128) | | | 2.2kΩ |
| Diode (124a) | | 2N2222 Collector Base Connected | |
| Diode (124b) | | 2N2907 Collector base Connected | |
| First capacitors (76) | | | 25 pF |
| Transistor (126c) | | 2N2907 | |
| Transistor (112) | | 2N2222 | |
| Inverters (100) | SGS Thomson | HCC 4069 | |
| NAND Gates (102) | SGS Thomson | HCC 4011 | |
| Inverters (104) (111) | SGS Thomson | HCC 4049 | |
| Capacitor (53) | | | 6.8 nf |
| Resistor (110) | | | 10KΩ |
| Resistor (114) | | | 2KΩ |
| Resistor (49) | | | 2.2KΩ |
| Resistor (51) | | | 22KΩ |

As stated before, one aspect of the present invention is the utilization of a voltage slew-rate control comprising current integrator 68. Referring to FIG. 2, the current integrator 68 includes first capacitor 76, current source 72, high speed buffer 70. This aspect of the invention utilizes the gain of the high speed buffer for integration of the constant current, assuming the current of current source 72 is constant. The circuit shown in, FIG. 3 is equivalent to an integrator, and the constant current, Iin, of the current source 72 is integrated by the capacitance C of the capacitor 76 into a linear output variation:

$$\frac{dVOUT}{dt} = \frac{Iin}{C}$$

As stated before the impedance of the buffer amplifiers 70 and 82 have to be reasonably small over their operating frequency range. Referring to FIG. 3, the gate to drain capacitance 118 of the field effect transistor 38 is shown. Typically with 0 bias, i.e., 0 voltage between gate and drain, capacitance 76 is about 100 to 500 picofarads, for example, depending on the device. Similarly, the gate to source capacitance 120 is 50 to 500 picofarads, for example. The biasing current source 122 may be set at 40 microamps, for example. The constant current source 72 may be, 5 microamps.

The supply voltage, VCC, 63 may be set at 12 volts, for example. Preferably, the first and second buffer amplifiers 70 and 82 are class AB-type amplifiers which impose a biasing current on the output stages of the buffers which provides greater speed and lower output impedance of the buffer.

Referring again to FIGS. 2 and 4, the sensing resistor 30 senses current $I_{1A}+I_2$. It is an object of the present invention, that the current, $I_T$ the total current through the motor 12 be maintained constant. The input voltage, $V_{in}$ 54 to the OP-AMP 50 is imposed on the noninverting input 52b. Assuming switch 56 is closed and 62 is open, phase 26a is energized through first transistor 38. The voltage, $V_{in1}$ 54, is used as a control parameter and may be 0.5 volts for example. As switch 56 is opening and switch 62 is closing $V_{in}/R_{sense}$=Current flowing. When switch 56 is opened, the output voltage of the first transistor 38 slews at a constant rate. The rate is determined by $I_{in}/C$ which voltage, V1 is shown in FIGS. 4 and 6. When switch 62 closes, the second transistor 44 becomes part of the transconductance loop which will force whatever current is necessary upon phase 26b such as to maintain a voltage drop on the sensing resistor 30 equal to $V_{in}$.

The circuit shown in FIG. 4 is the circuit shown in FIG. 2 redrawn without the control circuitry. In case 1, shown in FIG. 5, during the slewing portion the voltage across phase 26a is linearly decreasing. The current through phase 26a will decrease with an approximate quadratic function equal to $I_{in}(x1-kt^2)$ where k depends on the dv/dt (L). If the resistance portion of phase 26a is small, then there is mostly a quadratic function at the beginning when driver 22 commutates between phases. The fact that it is quadratic is not important; what is important is that the function slowly decreases in value so that second transistor 44 has a possibility of regulating the current through the phase 26b so that the total current is constant. The second transistor 44 makes up the current through phase 26b which is missing from the constant value which is $V_{in}/R_{sense}$. To sense the total current, the transconductance control loop must go through sensing resistor 30; that is the only point for sensing the total current. The difference between case shown in FIG. 5 and case 2 shown in FIG. 6 is that in case the voltage output at the drain of the first field effect transistor 38 slews too fast; therefore it reaches the supply Vcc; before the current in phase 26a is exhausted. Therefore, the recirculating diode 90 shown in FIG. 4 turns on and most of $I_{in}$ flows through diode 90. At that point most of the current flowing through diode 90 will not be sensed by the sensing resistor 30. Since it cannot be sensed, the regulating loop does not regulate properly. That is why $I_{1B}$ flows through 90. At that point, field effect transistor 44 regulates through the control loop for constant drop across the sensing resistor 30. The current through diode 90 is in excess of the total current sensed by resistor 30 and is not seen by the sensing resistor and is not part of the feedback, therefore, $I_T$ exceeds for some time the constant current desired depending on the inductance of the winding. This represents current ripple which also represents torque ripple.

In case 2 shown in FIG. 6, the regulation of the slew rate is proper. Current $I_{L1}$, shown in FIG. 4, exhausts itself by decaying completely before V1 exceeds the supply voltage and therefore the current $I_{L1}$ always flows through first transistor 38 and the sensing resistor 30. As a result, the total current flowing in the circuit is always present in the sensing resistor 30. If the slewing rate is too fast, a current ripple will be produced. If the slewing rate is slower, V1 will not reach the supply voltage. The optimum is a trade off between current ripple and commutation time and depends on the application.

I claim:

1. A system for use with a brushless, polyphase, direct-current motor having a rotor and stator coils, and a commutation circuit for providing sequencing signals, for maintaining a constant total current in said stator coils during commutation, comprising:

a sense resistor connected at one end to a reference potential;

a feedback amplifier having an inverting input connected to another end of said sense resistor and a non-inverting input connected to a reference voltage;

first and second switches each connected at a first end to an output of said feedback amplifier and connected to be operated by said sequencing signals;

a first transistor connected between a first stator coil and said sense resistor;

a second transistor connected between a second stator coil and said sense resistor; and a first current integrator connected to a second end of said first switch to control the turn-off slew rate of current in said first stator coil when said first switch is opened.

2. The system of claim 1 wherein said first and second transistors are IGFETs.

3. The system of claim 1 wherein said first current integrator comprises a first buffer amplifier having an input connected to the second end of said first switch and an output connected to a control element of said first transistor, a capacitor connected between said first stator coil and the input to said first buffer amplifier, and a current source connected between the input to said first buffer amplifier and the reference potential.

4. The system of claim 3 wherein said first transistor is an IGFET having a drain connected to said first stator coil, a gate connected to the output of said first buffer amplifier, and a source connected to said sense resistor.

5. The system of claim 1 further comprising a second current integrator connected to a second end of said second switch to control the turn-on slew rate of current in said second stator coil when said second switch is closed, said second current integrator comprising a second buffer amplifier having an input connected to the second end of said second switch and an output connected to a control element of said second transistor, a capacitor connected between said second stator coil and the input to said second buffer amplifier, and a current source connected between the input to said second buffer amplifier and the reference potential.

6. The system of claim 5 wherein said second transistor is an IGFET having a drain connected to said second stator coil, a gate connected to the output of said second buffer amplifier, and a source connected to said sense resistor.

7. The system of claim 1 wherein said first current integrator comprises a first buffer amplifier having an input connected to the second end of said first switch and an output connected to a control element of said first transistor, a capacitor connected between said first stator coil and the input to said first buffer amplifier, and a current source connected between the input to said first buffer amplifier and the reference potential, and wherein said system further comprises a second current integrator, said second current integrator comprises a second buffer amplifier having an input connected to the second end of said second switch and an output connected to a control element of said second transistor, a capacitor connected between said second stator coil and the input to said second buffer amplifier, and a current source connected between the input to said second buffer amplifier and the reference potential.

8. The system of claim 7 wherein said first transistor is an IGFET having a drain connected to said first stator coil, a gate connected to the output of said first buffer amplifier, and a source connected to said sense resistor, and wherein said second transistor is an IGFET having a drain connected to said second stator coil, a gate connected to the output of said second buffer amplifier, and a source connected to said sense resistor.

9. The system of claim 8 wherein said first and second buffer amplifiers have an output impedance of less than about 500 ohms over their operating frequency ranges.

10. The system of claim 8 wherein said first and second buffer amplifiers each have an operating frequency bandwidth at least ten times the resonant frequency of said first stator coil and its parasitics together with said first transistor.

11. In combination with a brushless direct current motor system, said system including a brushless direct current motor including a permanent magnet rotor, a stator having multiple phases, commutation means for controlling the timing and sequencing of excitation between said multiple phases in a predetermined commutation sequence, driver means for providing current flow to said phases as controlled by said commutation means, a voltage supply means for providing a voltage source to said driver means, the improvement which comprises:

said driver means further comprising commutation current control means for controlling, during commutation between said phases, the rate of turn-off of the current flowing in one of said phases while simultaneously controlling the rate of turn-on of the current flowing in another phase of said multiple phases to maintain a constant total current flowing in said multiple phases when commutating between said one phase which said commutation current control means is turning off and said other phase which said commutation current control means is turning on, whereby current ripple is minimized in said motor thereby controlling torque ripple and preventing unnecessary stress and noise on said motor; said commutation current control means comprising: current sensing resistor means having one end connected in circuit with one end of said one phase being turned off and said current sensing resistor means having said one end also connected in circuit with one end of said other phase being turned on and said current sensing resistor means having the other end connected in circuit with a reference potential;

operational amplifier means, said operational amplifier means having an inverting input and a non-inverting input;

a voltage source having a predetermined voltage connected in circuit with said non-inverting input of said operational amplifier means, said inverting input connected in circuit with said current sensing resistor means;

a first switch means connected in circuit between the output of said operational amplifier means and a gate of a first field effect transistor means, said first switch means in operative relationship with said commutation means;

a second switch means connected in circuit between the output of said operational amplifier means and a gate of a second field effect transistor means, said second switch means in operative relationship with said commutation means;

a first slew-rate control means connected in circuit between said first switch means and the gate of said first transistor means and a drain of said first transistor means, whereby upon said commutation means causing said first switch means to open while causing said second switch means to close said first slew-rate control means controls the rate of turn-off of the current flowing in said one phase while said current sensing resistor means senses the sum of the current flowing in said first transistor means and said second transistor means and imposes a feedback voltage indicative of said summed current at said inverting input of said operational amplifier means, said operational amplifier means produces a voltage at the output of said operational amplifier means representative of the voltage difference between said predetermined voltage of said voltage source and said feedback voltage whereby said voltage difference at the gate of said second transistor means controls the rate of turn-on of said other phase so that the total current in said phases equals said summed current of said first transistor means and said second transistor means, said first slew-rate control means including a first current integrator means comprising, a first buffer amplifier means having a predetermined operating frequency range, said buffer amplifier means is connected in circuit between said first switch means and said gate of said first transistor means, a first current source connected in circuit with the input of said first buffer amplifier means, a first capacitor means connected in circuit between the input of said first buffer amplifier means and said drain of said first transistor means;

and a second slew-rate control means for providing slew-rate control of said other phase when said other phase is turned-off by said commutation means, said second slew-rate control means connected in circuit between said second switch means and said gate of said second transistor means and a drain of said second transistor means.

12. The combination of claim 11, wherein said stator comprises three phases.

13. The combination of claim 11, wherein said first transistor means having a drain connected in circuit with said one end of said one phase and a source connected in circuit with said one of said current sensing resistor means, a second transistor means having a drain connected in circuit with said one end of said other phase and a source connected in circuit with said one end of said current sensing resistor means.

14. The combination of claim 13, wherein said first transistor means comprises a first insulated gate enhancement mode effect transistor and said second transistor means comprises a second insulated gate enhancement mode field effect transistor.

15. The combination of claim 13, wherein said first slew-rate control means comprises a first current integrator means.

16. The combination of claim 15, wherein said first buffer amplifier means has a predetermined output impedance of less than about 500 ohms over the operating frequency range of said first buffer amplifier means.

17. The combination of claim 15, wherein said first buffer amplifier means has an operating frequency range such that the bandwidth of said buffer amplifier means is at least ten times the resonant frequency of said one phase including parasitics together with said first transistor means.

18. The combination of claim 11, wherein said second slew-rate control means comprises a second current integrator means.

19. The combination of claim 18, wherein said second current integrator means comprises a second buffer amplifier means having a predetermined operating frequency range and connected in circuit between said second switch means and said gate of said second transistor means, a second current source connected in circuit with the input of said second buffer amplifier means, a second capacitor mean connected in circuit between the input of said second buffer amplifier means and the drain of said second field effect transistor means.

20. The combination of claim 19, wherein said second current source is a second constant current source 21. The combination of claim 20, wherein said second buffer amplifier means has a predetermined output impedance of less than about 500 ohms over the operating frequency range of said second buffer amplifier means.

22. The combination of claim 21, wherein said second buffer amplifier means has an operating frequency range such that the bandwidth of said second buffer amplifier means is at least ten times the resonant frequency of said other phase including parasitics together with said second transistor means.

* * * * *